US012632424B1

(12) United States Patent
  Chen et al.

(10) Patent No.: US 12,632,424 B1
(45) Date of Patent: May 19, 2026

(54) AUTOMATED CODE GENERATION FOR DATABASE CONFIGURATION, SECURITY, AND OPERATION

(71) Applicant: Zoom Video Communications, Inc., San Jose, CA (US)

(72) Inventors: Jinhua Chen, Hefei (CN); Hao Hu, Hefei (CN); Cheng Liu, Hefei (CN); Di Qi, Hefei (CN); Wudi Tang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/916,147

(22) Filed: Oct. 15, 2024

(51) Int. Cl.
 *G06F 16/21* (2019.01)
 *G06F 8/30* (2018.01)
(52) U.S. Cl.
 CPC .............. *G06F 16/211* (2019.01); *G06F 8/30* (2013.01)
(58) Field of Classification Search
 CPC .................................. G06F 16/211; G06F 8/30
 See application file for complete search history.

(56) References Cited

U.S. PATENT DOCUMENTS

2005/0229152 A1* 10/2005 Connell .................... G06F 8/10
                                                                   717/137
2018/0330112 A1* 11/2018 Racz .................... H04N 21/835

* cited by examiner

*Primary Examiner* — Tyler J Torgrimson
(74) *Attorney, Agent, or Firm* — Kilpatrick Townsend & Stockton, LLP

(57) ABSTRACT

Systems and methods for automated code generation for database configuration, security, and operation are disclosed. In an example computer-implemented method, a computing system accesses database configuration information for a database. The computing system determines, based on the database configuration information, one or more database instructions to be executed by the database. The computing system generates, for each of the one or more database instructions, a program code portion for executing the database instruction. The computing system generates database client program code including the one or more program code portions. The computing system outputs the database client program code to a client device to cause the client device to execute at least a portion of the database client program code during a video conference hosted by a video conference provider.

20 Claims, 9 Drawing Sheets

500

ACCESS DATABASE CONFIGURATION INFORMATION FOR A DATABASE

510

DETERMINE, BASED ON THE DATABASE CONFIGURATION INFORMATION, ONE OR MORE DATABASE INSTRUCTIONS TO BE EXECUTED BY THE DATABASE

520

GENERATE, FOR EACH OF THE ONE OR MORE DATABASE INSTRUCTIONS, A PROGRAM CODE PORTION FOR EXECUTING THE DATABASE INSTRUCTION

530

GENERATE DATABASE CLIENT PROGRAM CODE INCLUDING THE ONE OR MORE PROGRAM CODE PORTIONS

540

OUTPUT THE DATABASE CLIENT PROGRAM CODE TO A CLIENT DEVICE TO CAUSE THE CLIENT DEVICE TO EXECUTE AT LEAST A PORTION OF THE DATABASE CLIENT PROGRAM CODE DURING A VIDEO CONFERENCE HOSTED BY A VIDEO CONFERENCE PROVIDER

550

Figure 5:
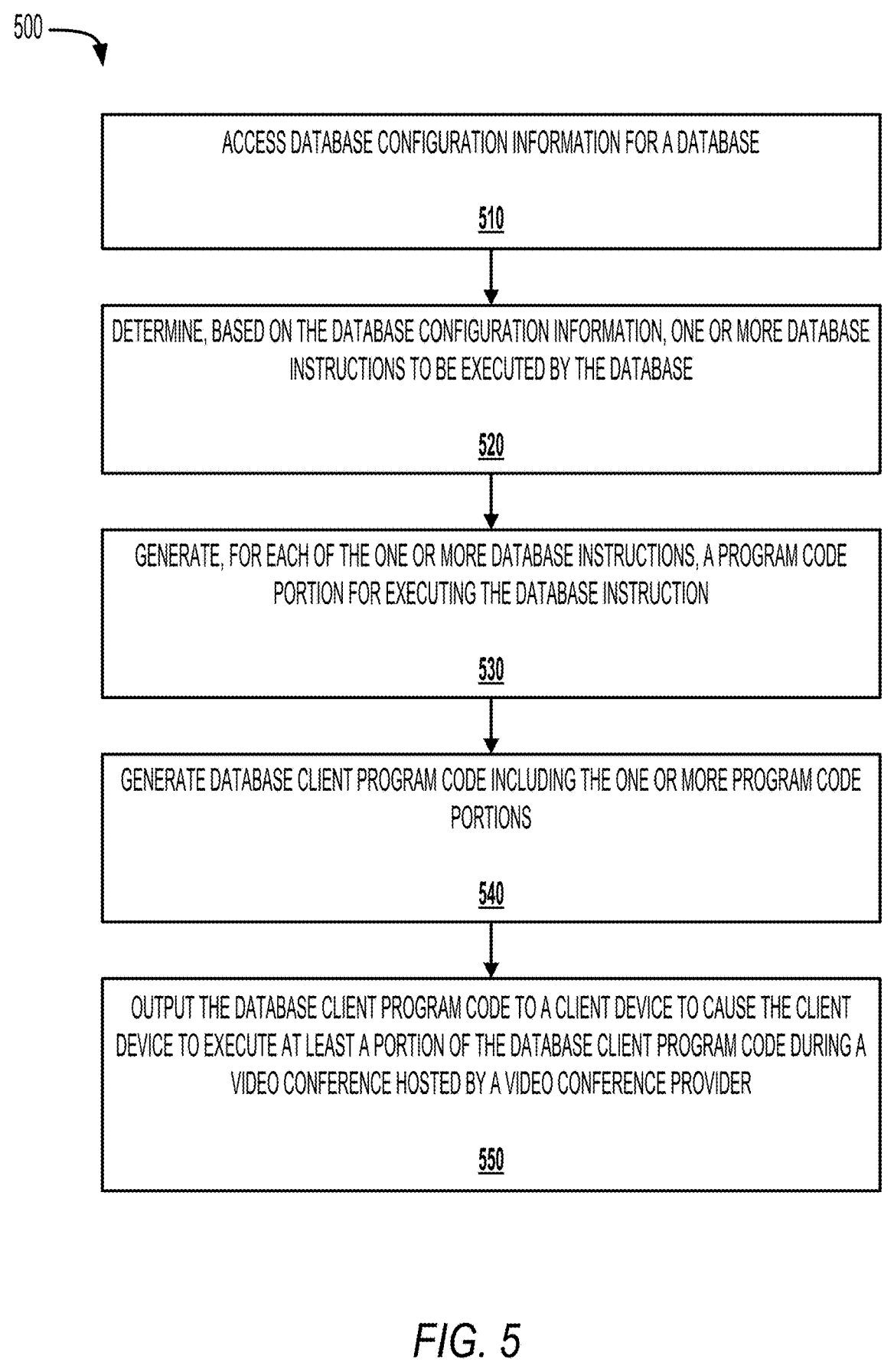

500 ⟍

```
┌─────────────────────────────────────────────────────────────────────┐
│      ACCESS DATABASE CONFIGURATION INFORMATION FOR A DATABASE         │
│                                                                       │
│                               510                                     │
└─────────────────────────────────────────────────────────────────────┘
                                  │
                                  ▼
┌─────────────────────────────────────────────────────────────────────┐
│ DETERMINE, BASED ON THE DATABASE CONFIGURATION INFORMATION, ONE OR MORE DATABASE │
│            INSTRUCTIONS TO BE EXECUTED BY THE DATABASE                 │
│                                                                       │
│                               520                                     │
└─────────────────────────────────────────────────────────────────────┘
                                  │
                                  ▼
┌─────────────────────────────────────────────────────────────────────┐
│ GENERATE, FOR EACH OF THE ONE OR MORE DATABASE INSTRUCTIONS, A PROGRAM CODE │
│          PORTION FOR EXECUTING THE DATABASE INSTRUCTION                │
│                                                                       │
│                               530                                     │
└─────────────────────────────────────────────────────────────────────┘
                                  │
                                  ▼
┌─────────────────────────────────────────────────────────────────────┐
│ GENERATE DATABASE CLIENT PROGRAM CODE INCLUDING THE ONE OR MORE PROGRAM CODE │
│                             PORTIONS                                   │
│                                                                       │
│                               540                                     │
└─────────────────────────────────────────────────────────────────────┘
                                  │
                                  ▼
┌─────────────────────────────────────────────────────────────────────┐
│ OUTPUT THE DATABASE CLIENT PROGRAM CODE TO A CLIENT DEVICE TO CAUSE THE CLIENT │
│ DEVICE TO EXECUTE AT LEAST A PORTION OF THE DATABASE CLIENT PROGRAM CODE DURING A │
│   VIDEO CONFERENCE HOSTED BY A VIDEO CONFERENCE PROVIDER               │
│                                                                       │
│                               550                                     │
└─────────────────────────────────────────────────────────────────────┘
```

```
{
  "preference": {
    "crypt": true,                          ←——— 705
    "database": "Meeting"
  },
    "config": {
    "locking_mode": "exclusive",
    "cache_size": 500,
    "page_size": 4076,                      ←——— 710
    "journal_mode": "wal",
    "mmap_size": 256,
    "custom_vfs": "zoom_shared",
    "enable_vtable": true,
    "synchronous": "normal"
  },
    "tables": {
    "Settings": {
      "columns": {                          ←——— 715
        "SettingKey": { "type": "TEXT",
              "unique": true, "primary_key": true },
        "StringVal": "TEXT",
        "IntVal": "INT"
      },
      "index": ["SettingKey"],              ←——— 720
      "add": [{ "key": ["SettingKey",       ←——— 725
          "StringVal", "IntVal"] }],
      "query": [                            ——— 735
        { "key": ["SettingKey"] },
        { "key": ["SettingKey", "StringVal",
              "IntVal"], "order_by": "key", "DESC": true }
      ]                                                    ——— 740
    }                              ——— 730
  }
}
```

*FIG. 7*

AUTOMATED CODE GENERATION FOR DATABASE CONFIGURATION, SECURITY, AND OPERATION

FIELD

The present application generally relates to database administration during digital communications, and more particularly relates to techniques for automated code generation for database configuration, security, and operation.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 5 shows a flowchart of an example method for providing automated code generation for database configuration, security, and operation, according to some examples of the present disclosure.

FIG. 7 shows an example of a JSON database configuration information file according to some examples of the present disclosure.

BRIEF DESCRIPTION OF THE COMPUTER PROGRAM LISTINGS

Figure 1:
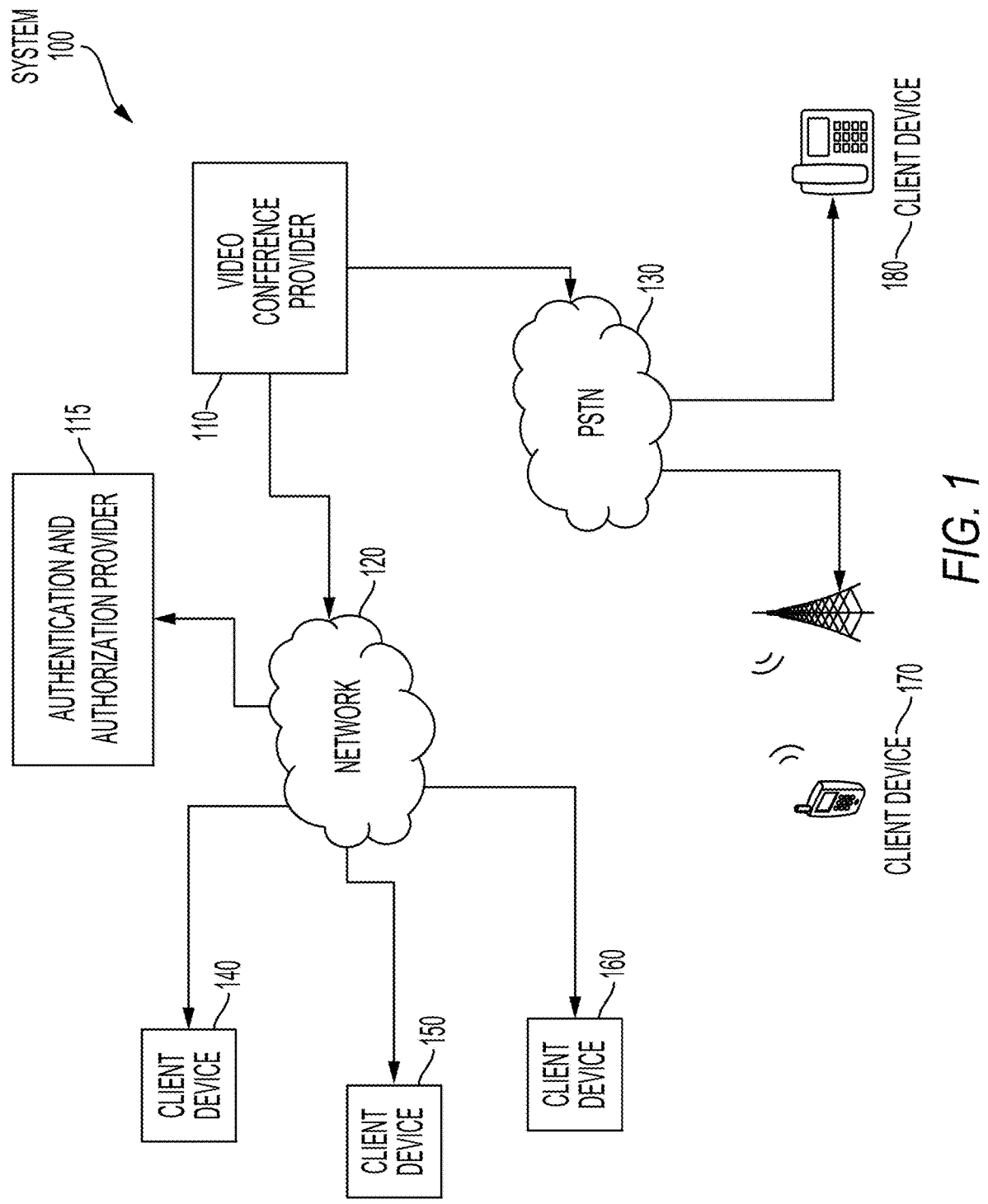
FIG. 1 shows an example system that provides videoconferencing functionality to various client devices, according to some aspects of the present disclosure.

Listing A shows an example of generated code, such as database client program code, that may be generated by the code generation subsystem given a particular database configuration information, according to some examples of the present disclosure.

Listing B shows another example of generated code, such as database client program code, that may be generated by the code generation subsystem given a particular database configuration information, according to some examples of the present disclosure.

DETAILED DESCRIPTION

Examples are described herein in the context of systems and methods automated code generation for database configuration, security, and operation. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Modern video conference providers can provide complex server- and client-side software that enable a variety of communication services such as video conferencing, chat, email, whiteboarding, telephony, and so on. As the capabilities of such platforms grow, so does the complexity of the associated software. So too does the burden associated with configuring, securing, and operating the associated software grow. Consequently, teams of developers of video conference provider software face significant challenges in developing and maintaining the associated software.

For example, video conference client software may use a local database to store data, configuration information, display assets, and so forth. A local database includes a database for which the data itself is in a local memory or filesystem, as opposed to a remote server. Ensuring secure, performant database operations across a diverse array of possible client devices, computing platforms, and performance specifications may be difficult to manage without standardized database client code. For instance, consider the example of the popular open-source relational database, SQLite, used in video conference client software. SQLite has an array of possible configuration options, Structured Query Language ("SQL") optimizations, and security features that must be considered each time the client software reads or writes from the database. Lack of standardized database configuration and operation code can lead to data corruption, security vulnerabilities (e.g., SQL injection attacks), inefficient database operations, incompatibility issues across platforms, or errors during database migrations or maintenance.

These challenges can be addressed using the techniques for automated code generation for database configuration, security, and operation disclosed herein. In a non-limiting, illustrative method according to the present disclosure, a computing device, such as a client device used for software development of video conference client applications that involve using a local SQLite database is being used to develop database client code. The computing device first accesses database configuration information for a database. For example, the database configuration information may be a file such as a JavaScript Object Notation ("JSON") file that includes configuration settings, database table creation specifications, index configurations, predefined queries, and so on, according to a particular syntax.

The computing device then determines, based on the database configuration information, one or more database instructions to be executed by the database. For example, if the database configuration information specifies information about a database table to be created, then an associated SQL statement such as a "CREATE TABLE" statement can be determined. In another example, if the database configuration information includes a predefined query, then an associated SQL statement such as a "SELECT" statement can be determined. Notably, the "SELECT" statement may be configured to use sanitized arguments for query parameters that provides protection against security threats such as SQL injection attacks.

The computing device generates, for each of the one or more database instructions, a program code portion for executing the database instruction. For example, in the "CREATE TABLE" example, a corresponding C++ code portion may be generated that executes the "CREATE TABLE" statement in the context of a C++ database client program. The C++ program may use a generic SQL API or an SQLite API to execute the "CREATE TABLE" statement against the local database.

The computing device generates database client program code including the one or more program code portions. The computing device may use, for example, a template that can be populated with the program code portions generated above to generate a complete database client software program. For instance, the template may include headers, macros, variable declarations, namespaces, and other programming constructs needed to constitute a complete program or library. The template may include placeholders for the generated program code portions to be inserted.

The computing device then outputs the database client program code to a client device to cause the client device to execute at least a portion of the database client program code during a video conference hosted by a video conference provider. For example, the database client program code may be incorporated (e.g., imported as a library or package) into a video conference client application that accesses the local SQLite database during a video conference. For instance, the various UI features shown during a video conference may be configured using information obtained from the SQLite database. The database client program code generated using the techniques disclosed herein can be used to configure and secure the database prior to use and to query the database during video conference operations.

Systems and methods according to the present disclosure provide significant improvements in the technical field of database administration during digital communications. Automated code generation can ensure consistent and optimized database performance, reducing the likelihood of errors and inefficiencies, thereby reducing the consumption of computational resources. The reliability and speed of database interactions can be improved, which is particularly important for real-time communications applications such as video conferencing. Additionally, these techniques can facilitate cross-platform compatibility by generating adaptable and consistent database client code, thus reducing compatibility issues, easing the burden of managing disparate code bases, and ensuring uniform performance across platforms. The incorporation of standardized security techniques and best practices such as sanitized SQL queries can mitigate the risk of SQL injection attacks and other security vulnerabilities, improving the overall security of the database and of the video conferencing client application.

These illustrative examples are given to introduce the reader to the general subject matter discussed herein and the disclosure is not limited to these examples. The following sections describe various additional non-limiting examples of systems and methods for automated code generation for database configuration, security, and operation.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
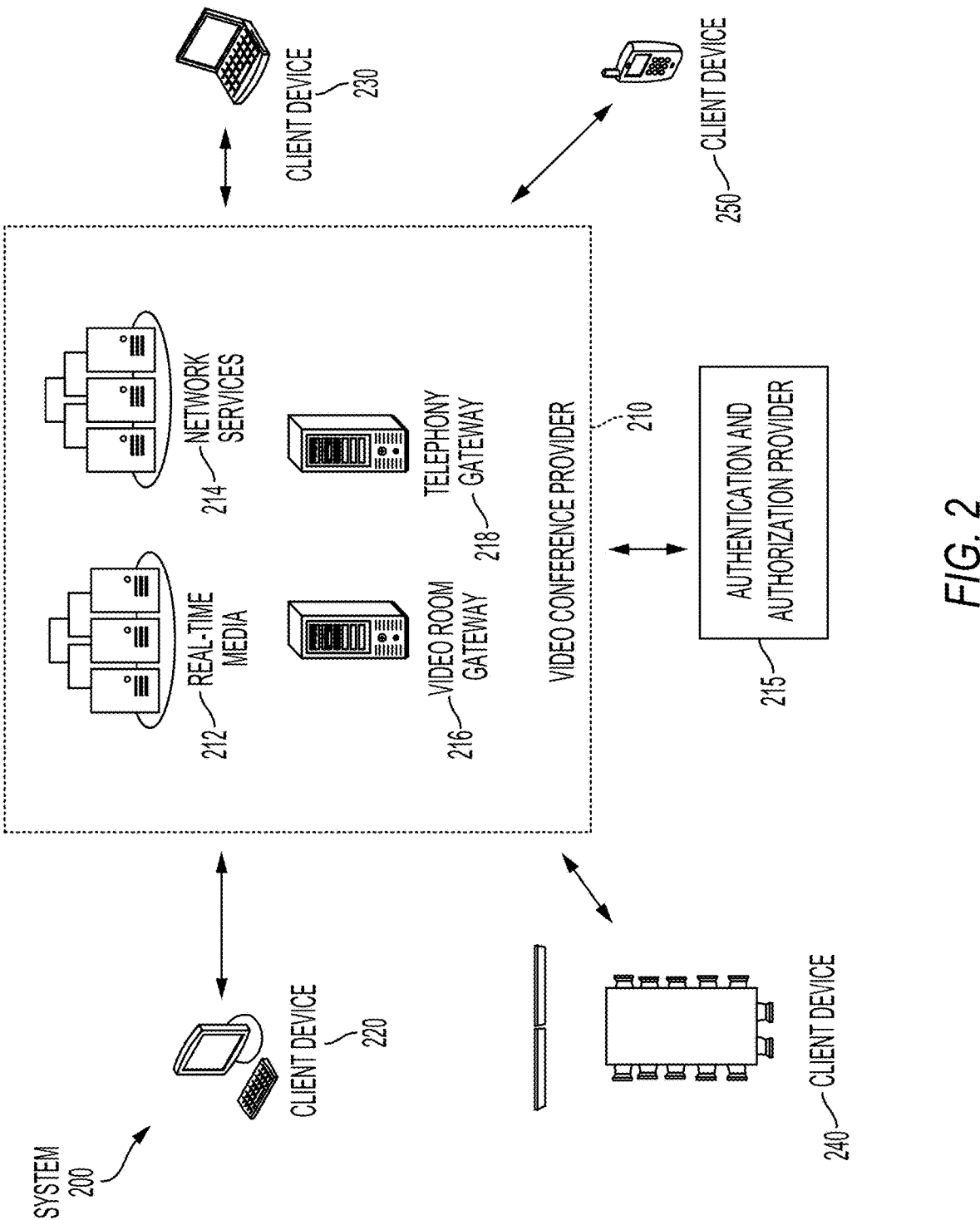
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
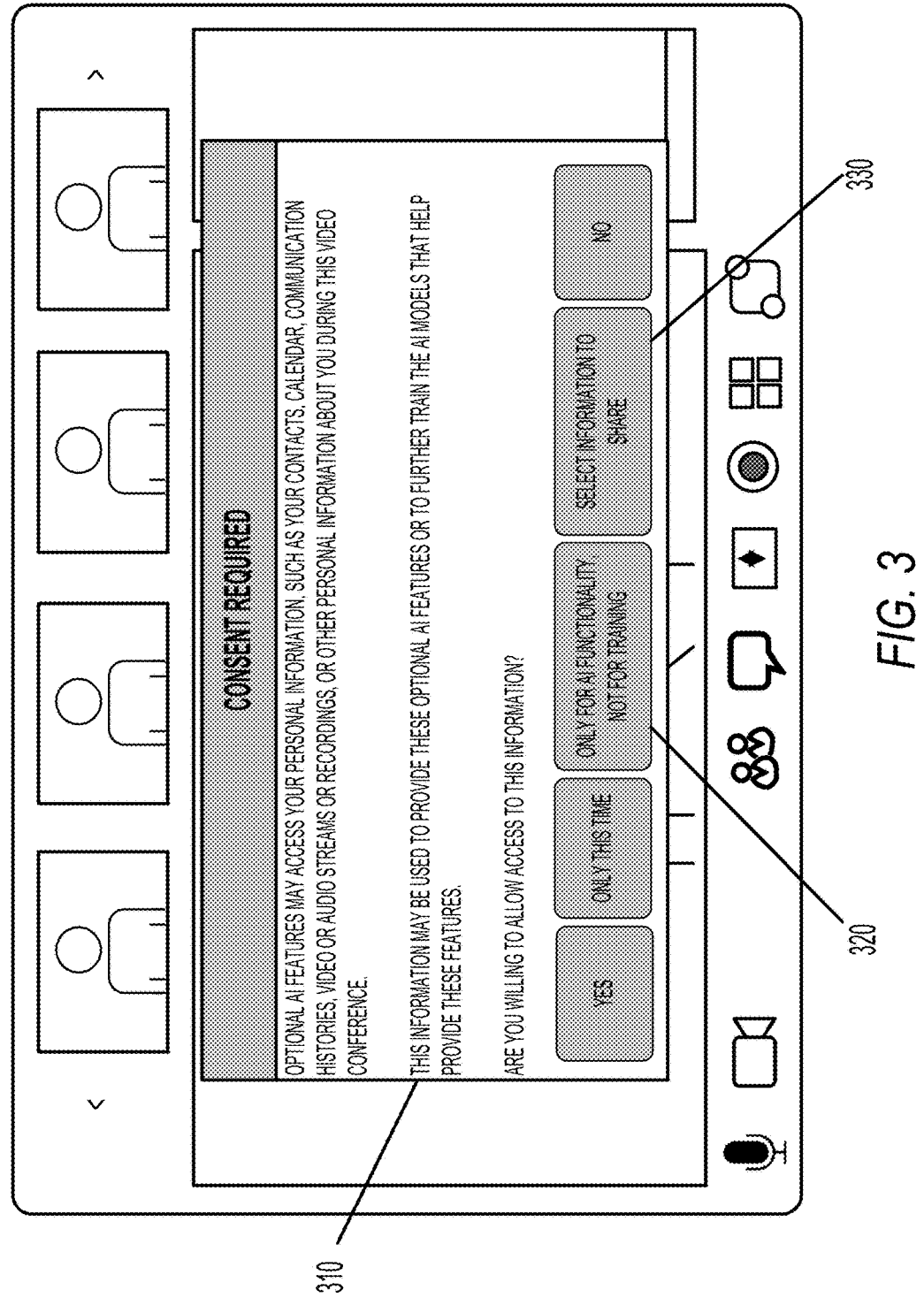
FIG. 3 shows an example user interface that may be used in some example systems configured for automated code generation for database configuration, security, and operation, according to some examples of the present disclosure.

Turning next to FIG. 3, FIG. 3 shows an example user interface 300 that may be used in some example systems configured for automated code generation for database configuration, security, and operation, according to some examples of the present disclosure. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the graphical user interface ("GUI") has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
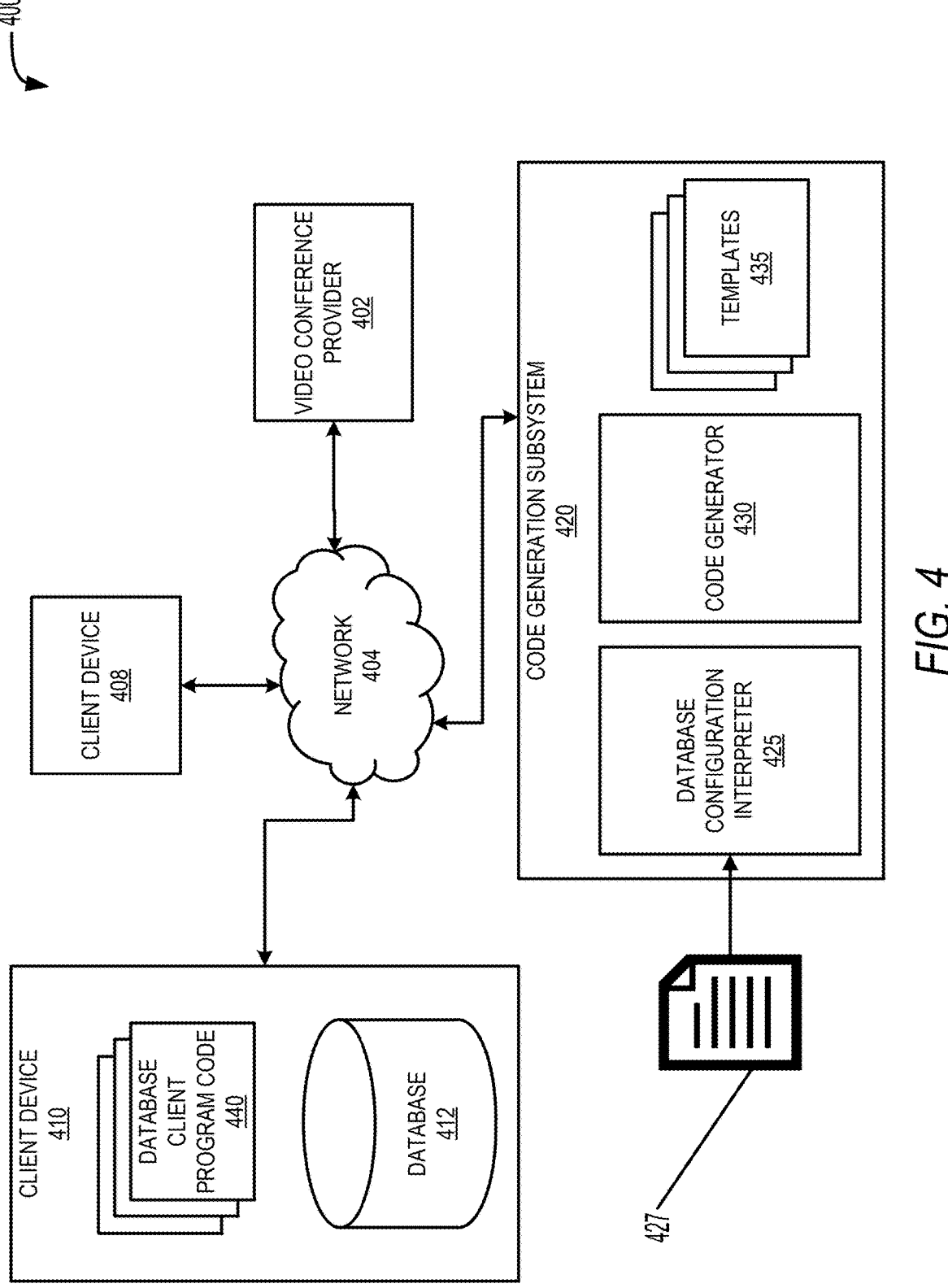
FIG. 4 shows an example of a system that implements automated code generation for database configuration, security, and operation, according to some examples of the present disclosure.

Referring now to FIG. 4, FIG. 4 shows an example of a system 400 that implements automated code generation for database configuration, security, and operation, according to some examples of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the client software developed using the automated code generation for database configuration, security, and operation techniques according to the present disclosure. For example, the client devices 408, 410 may be laptops, desktops, smartphones, tablets, internet protocol (IP) phones, and so on executing video conference client software.

Examining a particular client device 410 to delve into certain concepts, client device 410 may be executing video conference client software (or other locally executing software) that includes database client program code 440 that can be used for accessing, reading from, writing to, or otherwise interacting with database 412. The database client program code 440 may be, for example, executable software elements included in video conference client software such as standalone compiled binary files, members of shared libraries, framework components or APIs, executable scripts or source code, and so on.

The database client program code 440 can be used to interact with the database 412 during execution of the video conference client software. While the database 412 is depicted in FIG. 4 as a component of the client device 410, the database 412 can likewise be an externally hosted database such as one executing in a standalone server or cloud-hosted virtual machine.

In some examples, the database 412 is a local, on-disk or in-memory database such as SQLite. SQLite and similar lightweight database implementations, such as H2 or Berkeley DB, may store data in a self-contained, single- or multiple-file format persisted on a local or network filesystem or other memory. Local, on-disk or in-memory databases of this type may or may not have a dedicated server process. For instance, SQLite operates without a server process. Access to the database file or memory is provided by client code in the accessing application.

External databases may include server-based database implementations such as MySQL, PostgreSQL, or Microsoft SQL Server that can store data across multiple files using a dedicated server process or processes. Such external databases can be likewise accessed using suitable client code. In some examples, the database client program code 440 may be agnostic to the underlying database implementation, provided standardized SQL-based database instructions are generated as described below. For instance, some examples may generate SQL statements compliant with standards such as ANSI SQL ensuring compatibility across different database implementations.

The database client program code 440 can be generated using a code generation subsystem 420. The code generation subsystem 420 may include components for automated code generation for database configuration, security, and operation. To generate client code, the code generation subsystem 420 can access database configuration information 427 for a database, such as database 412, using a database configuration interpreter 425. For example, the database configuration information 427 may be a JSON file, or other suitable semi-structured format, that defines database configurations, table structures, operations, among other possible database capabilities.

The database configuration interpreter 425 can determine, based on the database configuration information 427, one or more database instructions to be executed by the database. The database configuration information 427 may include a number of elements, some or all of which map to database instructions (e.g., SQL statements) that can be executed by database 412. For example, where the database configuration information 427 is a JSON file including a number of key-value pairs, certain key-value pairs may correspond to particular database instructions. For instance, the database configuration information 427 may include elements for configuring the database 412, creating, altering or deleting tables, creating indexes or secure, predefined queries.

The code generator 430 can generate, for each of the database instructions, a program code portion for executing the database instruction. For example, the database instructions determined by the database configuration interpreter 425 can be wrapped or otherwise integrated into code portions written in the target programming language such as C, C++, Java, Objective C, etc. In some examples, the code portion may be generated using a template. For instance, certain code fragments may be pre-authored for various possible database instructions into which the database instruction can be inserted. In some examples, the code portion may be generated using a code generation component such as a large language model ("LLM"), rule-based code generators, or domain-specific code generation tools.

The code generator 430 can then generate the database client program code 440 including the one or more program code portions using one or more templates 435 such as Jinja, Mustache, Handlebars, or Thymeleaf templates and an associated templating engine. The templates 435 may be pre-authored to include placeholders according to a particular syntax or API for the code portions previously generated that can be filled during code generation. The templates 435 may be, for example, C, C++, Java, or Objective C source code files that include a particular templating syntax integrated with the source code. As already mentioned, in some examples, the code portions may themselves be generated by the code generator 430 using templates 435. Any suitable programming language, or combination thereof, can be used as template 435 including compiled languages such as C, C++, Java, or Objective C, interpreted languages like Python, Ruby, or JavaScript, or scripting languages like PHP, Perl, or Bash.

The database client program code 440 can then be output to the client device 410 to cause the client device 410 to execute at least a portion of the database client program code 440 during a video conference hosted by a video conference provider. For example, the code generator 430 may output the database client program code 440 as object files, machine code, or a shared library suitable for integration into video conference client software. In some examples, the database client program code 440 can be integrated as a compile-time dependency (e.g., a Java JAR) but it can also be integrated as a runtime dynamic library such as a Windows dynamic-link library ("DLL") or Unix-based shared object ("so") file. In some examples, the database client program code 440 can be output to the client device 410 during operation of the video conference client software to dynamically add or update the database client program code 440 at the client device 410 without requiring reinstallation.

Referring now to FIG. 5, FIG. 5 shows a flowchart of an example method 500 for providing automated code generation for database configuration, security, and operation, according to some examples of the present disclosure. The description of the method 500 in FIG. 5 will be made with reference to FIG. 4, however any suitable system according to this disclosure may be used, such as the example systems 100 and 200, shown in FIGS. 1 and 2. It should be appreciated that method 500 provides a particular method for providing automated code generation for database configuration, security, and operation. Other sequences of operations may also be performed according to alternative examples. For example, alternative examples of the present disclosure may perform the steps outlined below in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices. For example, the description is given from the perspective of the code generation subsystem 420 but other configurations are possible. One of ordinary skill in the art would recognize many variations, modifications, and alternatives.

Figure 8:
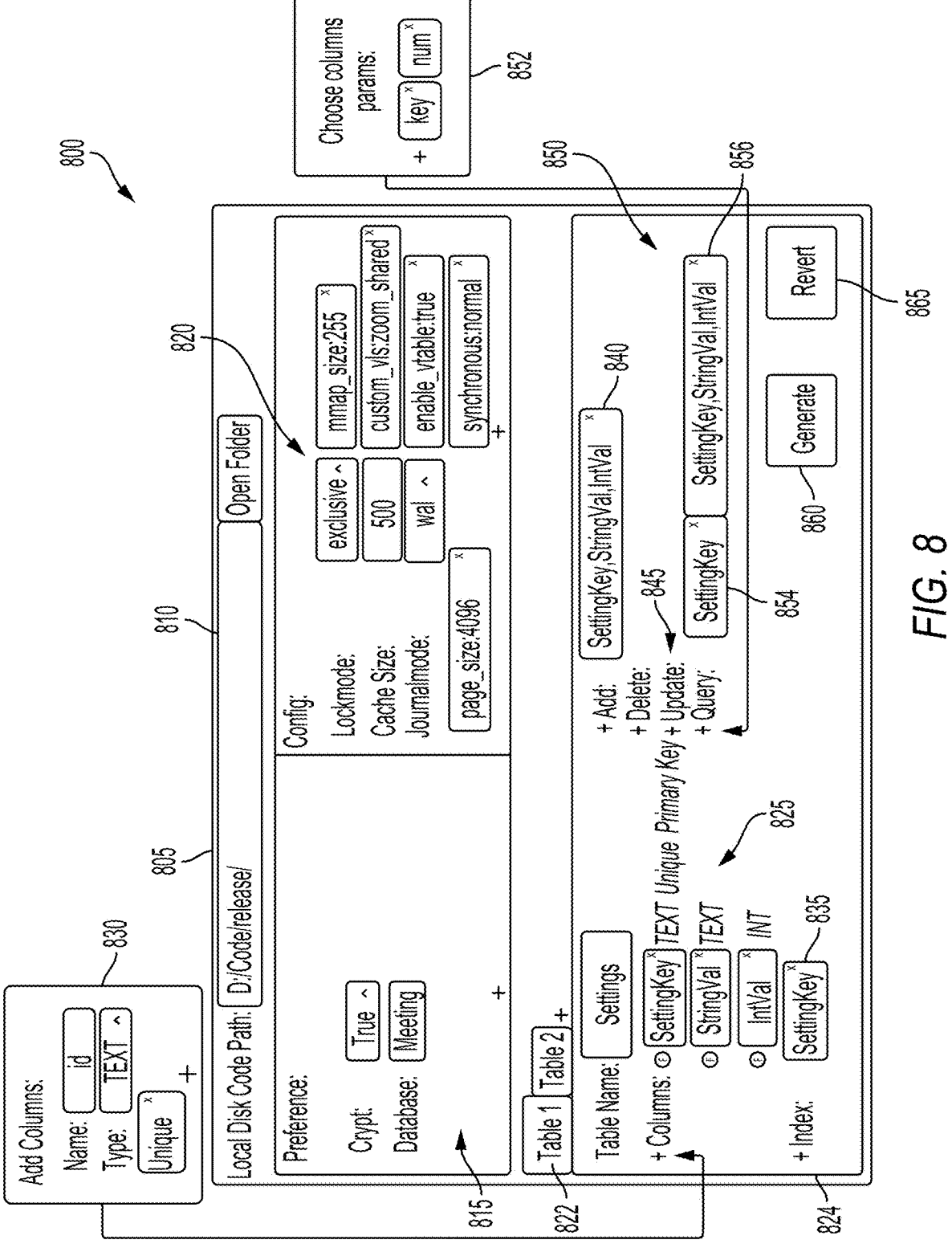
FIG. 8 shows another example of a UI for automated code generation for database configuration, security, and operation, according to some examples of the present disclosure.

The method 500 may include block 510. At block 510, a computing system such as a code generation subsystem 420 accesses database configuration information 427 for a database 412. For example, the database configuration information 427 may be a JSON (or other suitable structured or semi-structured) "schema" file that defines database configurations, table structures, and operations. One example of a JSON-based database configuration information 427 used in some examples is shown in FIG. 7 below. The database configuration information 427 may be received by manual input via user input using a suitable GUI, retrieved from a filesystem or database, or uploaded to the code generation subsystem 420 over a network 404. An example of a GUI that can be used for the development and generation of the database configuration information 427 is shown in FIG. 8 below.

Method 500 is not limited to use with relational databases, however. This method can be used with any database that can be managed, configured, queried, or updated using a well-defined API. For instance, a non-limiting list of examples of other types of databases that may be used include document databases like MongoDB, key-value stores like Redis, or graph databases like Neo4j.

At block 520, the computing system determines, based on the database configuration information 427, one or more database instructions to be executed by the database. The database 412 may be, for example, a relational database such as a database that uses SQL for managing and querying structured data. In that case, the one or more database instructions are written in a SQL-based language. The relational database may be a lightweight database with data stored locally to a client device executing database client program code such as SQLite, but other relational databases such as MySQL, PostgreSQL, or Microsoft SQL Server can be likewise used according to the techniques disclosed herein. For non-relational databases, the database instructions may be, for example, JSON-like queries or commands or key-value operations according to a particular syntax or API.

The one or more database instructions may include, for example, data definition instructions, data manipulation instructions, data control instructions, or transaction control instructions for managing and querying data in database 412. For example, in examples where the database instructions are written in a SQL-based language such as the SQL dialect used by SQLite, the instructions may include database configuration SQL statements. For instance, the SQL statement "PRAGMA page_size=4096;" can be used to configure the SQLite page size, which may correspond to the size of the data block read or written from the SQLite data file at a time.

The database instructions may further include SQL statements including predetermined queries that use parameterized arguments. For example, one predetermined SQL query can be written as "SELECT * FROM Settings WHERE SettingKey=?AND StringVal=?AND IntVal=?ORDER BY key DESC LIMIT ?;"));" in which the "?" represent parameters that can be passed by argument using a suitable programming mechanism. Use of parameterized queries using this pattern and the like can be secure against SQL injection attacks. For instance, arguments passed to the predetermined queries can be sanitized to ensure that they do not include malicious SQL code.

The database instructions may further include SQL statements for creating, altering, or deleting a table, such as "CREATE TABLE Settings (SettingKey TEXT, StringVal TEXT, IntVal INT);" Other SQL commands may be similarly used, such as "ALTER TABLE," "DROP TABLE," "UPDATE," "DELETE FROM," and others. In some examples, the SQL statements for creating, altering, or deleting a table can be parameterized similarly to the predetermined queries described above. For example, the SQL statement "INSERT INTO Settings (SettingKey, StringVal, IntVal) VALUES (?, ?, ?);"));" can use a similar strategy to prevent SQL injection attacks.

At block 530, the computing system generates, for each of the one or more database instructions, a program code portion for executing the database instruction. The one or more program code portions may be, for example, code fragments written in a programming language that is different from the SQL-based language such as C, Java, C++, C#, or Objective C, or other programming language.

For example, the program code portions may be include database instruction "wrapped" in statements from a particular programming language. For instance, a simple SQL-based instruction that does not require any additional arguments could be executed using a suitable language or library function. In one example C-like programming language, one such example statement could be "Statement s(_db→GetCachedStatement(DB_HOSTNAME, 'SELECT * FROM Settings;').Run( )".

In some examples, the program code portions may include larger blocks of program code. For example, more complex database instructions may require parameterized functions, configuration information, functional programming constructs, and so on. In these cases, the program code portions may be generated by the code generator 430 based on a determination made for each database instruction. For instance, some simple database instructions may be simply wrapped as shown in the previous paragraph, while others may be expanded into a multi-line program code portion including one or more functions, methods, lambdas, closures, anonymous functions, classes, and so on.

In some examples, the code portions may be generated using a code generation component such as an LLM, rule-based code generators, or domain-specific code generation tools. For instance, an LLM such as one based on the Generative Pretrained Transformer ("GPT") series of LLMs can be used for code generation. An example prompt to generate C++ code given a SQL-based database instruction could be: "Generate a C++ function that executes the following SQL query: SELECT * FROM Settings;". The prompt or additional context provided to the LLM may include information about dependencies, libraries in use, code styles, and so on.

At block 540, the computing system generates database client program code including the one or more program code portions. For example, the code generator 430 may access one or more templates 435 authored in a programming language such as C, Java, C++, C#, or Objective C, or other programming language. The templates 435 may be, for example, reusable text files that define the layout and logic for dynamically generating program code written in the programming language. The templates 435 may include a number of locations or placeholders into which the code portions can be inserted according to a specified mapping. For example, the templates 435 may be Jinja templates that use text strings such as "{% . . . %}" or "{{ . . . }}" as indicators of locations or placeholders during code generation. Other suitable examples of template providers include Mustache, Handlebars, or Thymeleaf, among many others.

For each template, the code generator 430 can generate a database client code file by mapping the program code portions generated in block 530 to a location in the template. For example, the program code portions can added to a data structure such as a hash map or associative array having a number of keys and values. Each program code portion can be a value associated with a particular key. The keys may correspond to locations in the templates 435, identified using alphanumeric labels or other means of identification. The code generator can generate each database client code file by inserting the values for each key to its corresponding location in a template. The collection of database client code files together can constitute the database client program code 440.

The database client program code 440 may be a collection of software elements that can be used by a client application to access, manage, or query the database 412. It may be, for example, a collection of source code files such as class files, headers, configuration files, or scripts. In some examples, the database client program code 440 may further include one or more unit tests that can be used to verify the proper functionality of the database client program code 440. The database client program code 440 may be uncompiled source code or, in some examples, may be compiled, linked, or otherwise executable object or machine code.

Listing A shows an example of generated code, such as database client program code 440, that may be generated by the code generation subsystem 420 given a particular database configuration information 427, according to some examples of the present disclosure. In particular, Listing A is a C++ header file that may be generated as part of the code generation process according to some examples. The C++ header file of Listing A may include declarations of classes, functions, methods, or variables, that can be shared across multiple source files, such as the examples of Listing B.

Listing B shows another example of generated code, such as database client program code 440, that may be generated by the code generation subsystem 420 given a particular database configuration information 427, according to some examples of the present disclosure. In particular, Listing B includes implementations of the classes and functions defined in the header file of Listing A.

Listings A and B together show example database client program code 440 involving an example Settings tables and some associated operations. Listings A and B includes method to initialize the database connection, create the Settings table if it does not already exist, insert data into the Settings table, query the Settings table using predefined, secure queries, and clearing the Settings table. Each class, function, method, variable, etc. can be generated in response to an entry or entries in the database configuration information 427 that is subsequently input to a template to generate the database client program code 440. It should be emphasized that that Listings A and B are only examples and that various other implementations are possible including different C++ implementations or different implementations in other programming languages.

At block 550, the computing system outputs the database client program code 440 to a client device to cause the client device to execute at least a portion of the database client program code 440 during a video conference hosted by a video conference provider. For example, the database client program code 440 can be exported to or added to a shared library file or object that can be incorporated into a client application. For instance, the video conference client application may use a device-local SQLite database to persist configuration, UI information, locally cached user or meeting data. The database client program code 440 can be imported into the video conference client application as a shared library, which can then use the database client program code 440 at runtime.

Figures 6A, 6B:
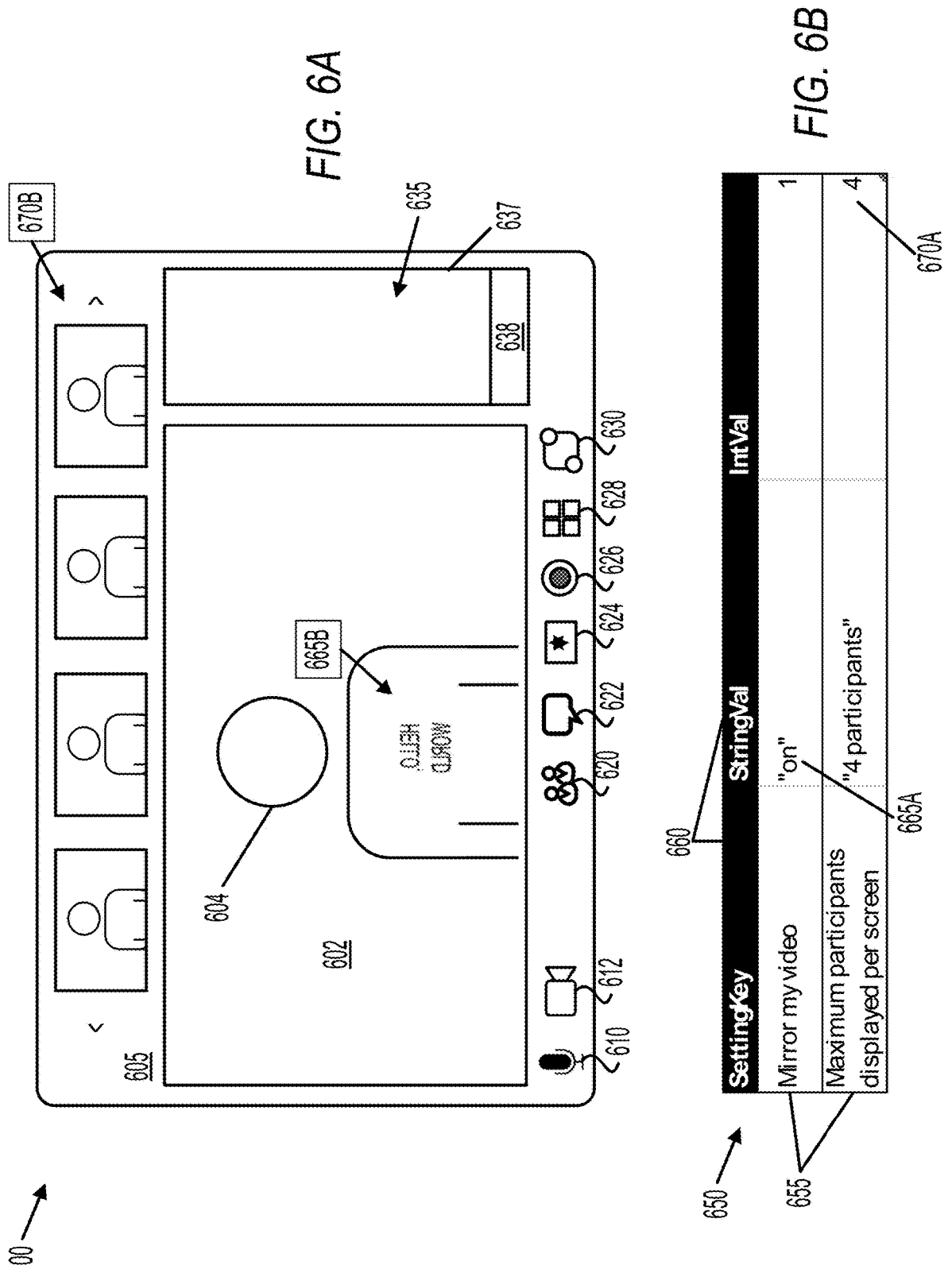
FIG. 6A shows an example of a user interface ("UI") for automated code generation for database configuration, security, and operation, according to some examples of the present disclosure.
FIG. 6B shows an example database table that may be accessed by the client device executing video conference client software that includes database client program code generated using automated code generation for database configuration, security, and operation, according to some examples of the present disclosure.

Turning next to FIG. 6A, FIG. 6A shows an example of a UI 600 for automated code generation for database configuration, security, and operation, according to some examples of the present disclosure. FIG. 6A depicts an example of a UI 600 that may be shown on a display device of a client device 410 during video conferencing or chat messaging, although the techniques of this disclosure may be implemented in a variety of client UI contexts. In particular, UI 600 depicts an example of an in-progress video conference whose configuration and layout is determined, at least in part, using data retrieved from a local database 412 such as a SQLite database.

UI 600 shows an in-progress video conference as may be provided by suitable video conference client software. UI 600 includes a main speaker window 602. In some examples, the UI 600 is configured to display the video conference participant 604 that is currently speaking (e.g., "speaker view") on the main speaker window 602, but other configurations are possible. For instance, some examples include a UI control for "pinning" a particular participant who can be shown in main speaker window 602 regardless of who is speaking.

The UI 600 includes a number of video conference participants 605. In the UI 600 configuration depicted, the participants 605 are shown at the top of the UI 600. Depending on the configuration, in various examples, the participants 605 may be arrayed in a grid-like fashion, may not be shown at all, or may be displayed in some other manner. In this example, the participants 605 are shown above the main speaker window 602 as smaller participant windows, which allow the participant to view some of the other participants in the video conference, as well as controls ("<" and ">") to let the host scroll to view other participants in the video conference.

The UI 600 includes a number of controls for configuring the video conference or interacting with the participants 605. For example, the UI 600 includes controls 610 and 612 allow a participant to toggle on or off audio or video streams captured by a microphone or camera connected to the client device 410. Control 620 allows the participant to view any other participants present in the video conference along with the participant. Control 622 allows the participant to execute an application or client software function to send text or chat messages to other participants, whether to specific participants or to the entire meeting. Control 624 allows the participant to share content from their client device. Control 626 allows the participant toggle recording of the meeting, and control 628 allows the participant to select an option to join a breakout room. Control 630 allows the participant to launch an app within the video conference client software, to, for example, access content to share with other participants in the video conference.

The control 622, when selected, can launch a chat application 635. The chat application includes a main chat window 637 that shows a chat history among the participants or a subset thereof. The chat application also includes a chat input control 638 that can be used to input chat messages, share images or video, choose emojis, start threads, and so on.

FIG. 6B shows an example database table 650 that may be accessed by the client device 410 executing video conference client software that includes database client program code 440 generated using automated code generation for database configuration, security, and operation, according to some examples of the present disclosure. The table 650 may be, for example, a table in a locally stored SQLite database. The table 650 includes a number of rows 655, each of which has a number of columns 660 or fields. The names or identifiers of columns 660 are depicted at the top of table 650.

The table 650 is used, in this example, to persist local UI 600 configurations. For example, configuration 665A corresponds to a "mirror my video" configuration setting relating to whether the displayed self-view that may be shown in main speaker window 602 or among the participants 605 is horizontally inverted. This setting is depicted in UI 600 at 665B where the participant user of client device 410 is shown as horizontally inverted. The configuration 665A has a Boolean value represented as the String "on". In another example, configuration 670A corresponds to a "maximum participants displayed per screen" setting. In this case, the configuration 660A is an integer value of 4, corresponding to the number of participants 605 displayed in UI 600, labeled with 670B.

While configuration 660A uses a string value in table 650 and configuration 670A uses an integer value, other suitable data types may likewise be used. For example, table 650 provides duplicate values in columns 660 using both string and integer datatypes. In some examples, one or both datatypes may be used according to the particular application.

Table 650 is shown here to illustrate one example of how a database table may be employed in video conference client software or other software by way of database client program code 440. However, database tables may have other uses in addition to the persistence of configuration settings as illustrated here. For example, database tables may be used for user information or profiles, event logging, managing sessions, user permissions, contact lists, and so on.

FIG. 7 shows an example of a JSON database configuration information file 700 according to some examples of the present disclosure. While a JSON file, or an excerpt therefrom, is shown in this example, any suitable structured or semi-structured file format could be used to equal effect. Other examples include extensible markup language ("XML"), yet another markup language ("YAML"), plain text, a declarative programming language syntax, and so on. Moreover, database configuration information file 700 includes a number of keys or fields and example values that correspond closely to the JSON format as it may be used in conjunction with a SQLite database. These are non-limiting examples included for illustrative purposes, but in general, the database configuration information file 700 may include keys, values, or other means of specification that include numerous possible database configurations, operations, settings, preferences, queries, optimizations, and so on as well as any other database.

The example database configuration information file 700 includes a preferences section 705 that can be used to specify code generation preferences or configurations such as the name of the database and whether database-level encryption could be enabled. Configuration section 710 includes SQLite configuration settings such as the locking mode or synchronicity setting for concurrent operations, the cache size and page size for memory consumption configurations, journaling mode (e.g., when and how do database writes occur), memory mapping, virtual filesystems, or virtual tables to improve efficiency, and so on. In general, any possible configuration setting of SQLite or the underlying database engine can be configured using the database configuration information file 700.

The remainder of the example database configuration information file 700 includes key/value pairs for creating tables, indexes, keys, and pre-built queries. These are merely examples and numerous functions of the SQLite API or comparable database API are likewise available according to various examples. At table section 715, a new "Settings" table is defined including a string-based primary key, another string column, and an integer column. The values from table section 715 may be used to, for example, create, recreate, or verify a new Settings table. At 720 an index is defined on the primary key of the Settings table. At 725, two secondary or foreign keys are defined on the Settings table. At 730, two queries are predefined. The first predefined query 735 may correspond to a SQL SELECT statement that filters on a specified primary key. The second predefined query 740 may correspond to a SQL SELECT statement that filters on specified primary and secondary keys and then orders the result using a lexicographical sort on the primary key. Both the first and second predefined queries 735, 740 can be configured to be secure against certain known security vulnerabilities such as SQL injection attacks.

FIG. 8 shows another example of a UI 800 for automated code generation for database configuration, security, and operation, according to some examples of the present disclosure. according to some aspects of the present disclosure. In particular, UI 800 depicts a GUI that can be used to configure and generate the database configuration information 427 such as the example JSON database configuration information file 700 shown in FIG. 7 above. The examples shown in UI 800 correspond generally to similar examples from the example JSON database configuration information file 700.

UI 800 includes main editing window 805 that can be used to create, update, or delete various portions of the database configuration information 427 identified in file input control 810. The file input control 810 may specify a new file or an existing file to be updated. In some examples, the database configuration information 427 can be saved locally on the client device of an application developer, at a network location, or in a component of the code generation subsystem 420.

Some portions of the main editing window 805 correspond to sub-objects of the example JSON database configuration information file 700 described above. Preference section 815 can be used to edit the values in the preferences section 705, as well as add new values or delete existing values. Likewise, configuration section 820 can be used to edit the values in the configuration section 710, as well as add new values or delete existing values.

Table section 824, selected using tab controls 822, can be used to add, edit, or delete portions of configurations, operations, or queries for particular tables, as shown in table section 715 above. In the selected table section 824 for example UI 800, the "Settings" table is being edited. Table configuration controls 825 include controls for updating the table name, columns, and datatype. Column add window 830 shows controls for adding a new column to a table, including a column name, data type, and other column metadata such as the uniqueness setting. Index control 835 can be used to add or update an index on a particular column of the table. Keys controls 845 can be used to add, delete, or update primary or secondary (e.g., foreign) keys. At primary key add input field 840, certain columns are designated use as primary or secondary keys, as described above with respect to sub-object 725.

Query definition control 850 can be used to construct or edit predefined queries on the table. The column selector dialog window 852 can be used to identify columns that will be used in a predefined query as, for example, arguments to a SELECT statement or WHERE or JOIN clause. In the example implementation of query definition control 850 shown, two predefined queries are shown under construction. A first predefined query 854 uses only the primary key in the WHERE clause where a second predefined query 856 uses a compound key including elements from several columns. These examples of the query definition control 850 illustrate elements for constructing a simple predefined query. Examples may include a complex suite of controls for including various aspects of the SQL API into predefined queries.

The main editing window 805 includes a generate button 860 that can be used to convert the current configurations and settings of the various UI 800 controls into a database configuration information 427 such as the example JSON database configuration information file 700. The revert button 865 can be used to revert any changes made to an existing database configuration information 427.

Figure 9:
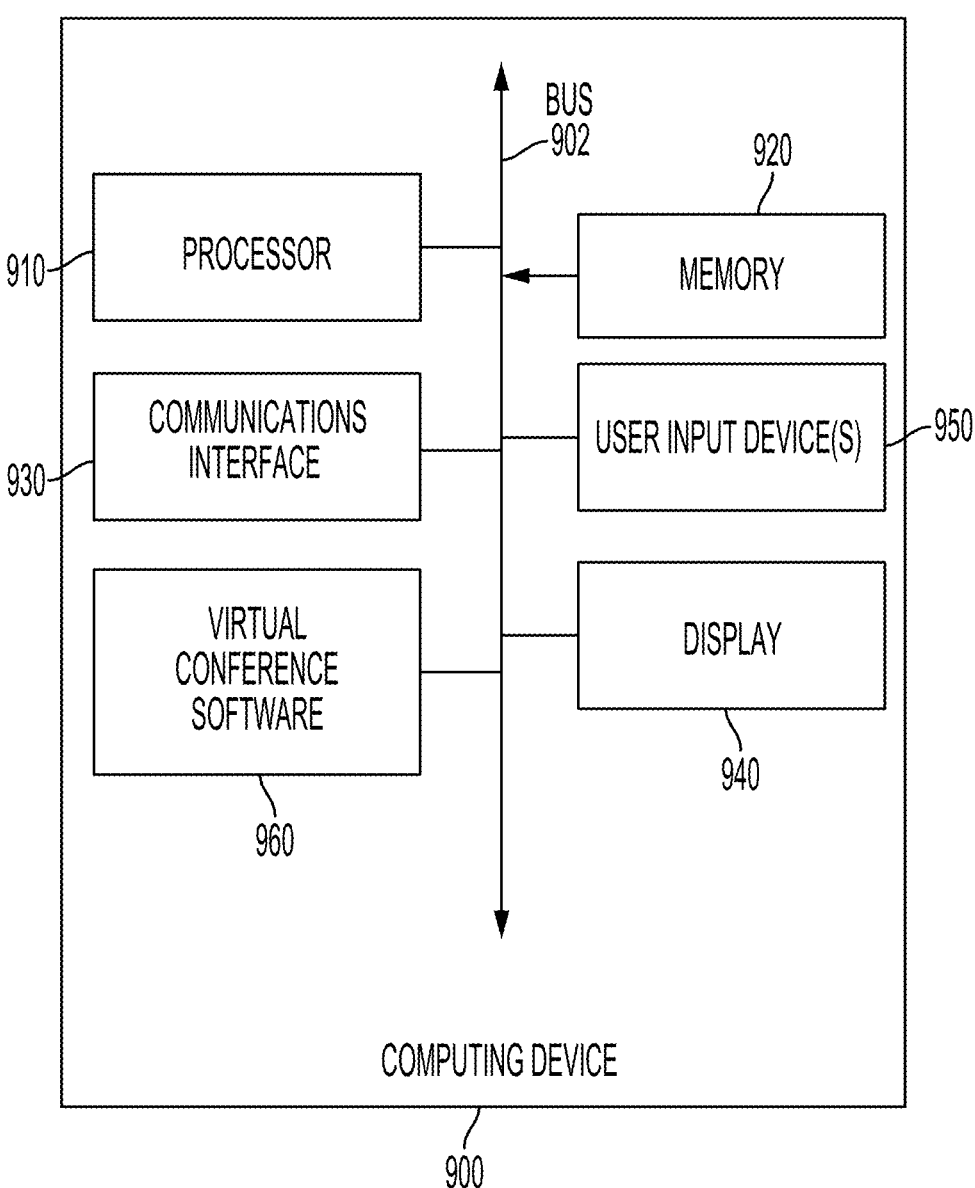
FIG. 9 shows an example computing device suitable for use in example systems or methods for providing automated code generation for database configuration, security, and operation, according to some examples of the present disclosure.

Referring now to FIG. 9, FIG. 9 shows an example computing device 900 suitable for use in example systems or methods for providing automated code generation for database configuration, security, and operation, according to some examples of the present disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for automated code generation for database configuration, security, and operation, according to some examples of the present disclosure according to different examples, such as part or all of the example method 500 described above with respect to FIG. 5. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes virtual conferencing software 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

COMPUTER PROGRAM LISTINGS

Listing A
    /* code auto generated by DB code Generator */
    #include "DB/database.h"

```
#include <string>
namespace PAAP {
    class Settings;
    class SettingsTable {
    public:
        SettingsTable ( );
        ~SettingsTable ( );
        CmmBool Init(Database* db);
        CmmBool CreateTable ( );
        CmmBool AddRow(SettingsParams& params);
        CmmBool                      QueryRow(std::
            vector<SettingsParams>& res, SettingsParams&
            params, CmmInt64 count);
        CmmBool         QueryRow1         (std::
            vector<SettingsParams>& res, SettingsParams&
            params, CmmInt64 count);
        CmmBool Clear (;
    private:
        Database* _db;
    };
}
```

---

Listing B

---

```
/* code auto generated by DB code Generator */
#include "SettingsTable.h"
#include "DB/statement.h"
#include "DB/transaction.h"
#include "json/json.h"
namespace PAAP {
    SettingsTable::SettingsTable( ) { }
    SettingsTable::~SettingsTable( ) { }
    CmmBool SettingsTable::Init(Database* db) {
        _db = db;
        return CmmTrue;
    }
    CmmBool SettingsTable::CreateTable( ) {
        if (!_db->DoesTableExist("Settings")) {
            const char query[ ] =
            "CREATE TABLE Settings (SettingKey TEXT, StringVal
TEXT, IntVal INT)";
            if (!_db->Execute(query))
                return CmmFalse;
        }
        return CmmTrue;
    }
    CmmBool SettingsTable::AddRow(SettingsParams& params) {
        if (!_db || !params.SettingKey.Has( ) ||
!params.StringVal.Has( ) || !params.IntVal.Has( )) return
CmmFalse;
        DB::Statement s(_db->GetCachedStatement(
                        DB_SQL_FROM_HERE,
                        "INSERT INTO Settings (SettingKey,
StringVal, IntVal) VALUES (?, ?, ?);"));
        s.BindString(0, params.ettingKey.Get( ).c_str( ));
        s.BindString(1, params.StringVal.Get( ).c_str( ));
        s.BindInt64(2, params.IntVal.Get( ));
        return s.Run( );
    }
    CmmBool
SettingsTable::QueryRow(std::vector<SettingsParams>& res,
SettingsParams& params, CmmInt64 count) {
        if (!_db || !params.SettingKey.Has( ) || count <= 0)
return CmmFalse;
        DB::Statement s(_db->GetCachedStatement(
                        DB_SQL_FROM_HERE,
                        "SELECT * FROM Settings WHERE
SettingKey = ? LIMIT ?; "));
        s.BindString(0, params.SettingKey.Get( ).c_str( ));
        s.BindInt64(1, count);
        while (s.Step( )) {
            SettingsParams s;
            s.SettingKey.Set(ColumnString(0));
            s.StringVal.Set(ColumnString(1));
            s.IntVal.Set(ColumnInt64(2));
```

---

Listing B

---

```
            res.push_back(s);
        }
        return res.size( ) > 0 ? CmmTrue : CmmFalse;
    }
    CmmBool
SettingsTable::QueryRow1(std::vector<SettingsParams>& res,
SettingsParams& params, CmmInt64 count) {
        if (!_db || !params.SettingKey.Has( ) ||
!params.StringVal.Has( ) || !params.IntVal.Has( ) || count <=
0) return CmmFalse;
        DB::Statement s(_db->GetCachedStatement(
                        DB_SQL_FROM_HERE,
                        "SELECT * FROM Settings WHERE
SettingKey = ? AND StringVal = ? AND IntVal = ? ORDER BY
key DESC LIMIT ?;"));
        s.BindString(0, params.SettingKey.Get( ).c_str( ));
        s.BindString(1, params.StringVal.Get( ).c_str( ));
        s.BindInt64(2, params.IntVal.Get( ));
        s.BindInt64(3, count);
        while (s.Step( )) {
            SettingsParams s;
            s.SettingKey.Set(ColumnString(0));
            s.StringVal.Set(ColumnString(1));
            s.IntVal.Set(ColumnInt64(2));
            res.push_back(s);
        }
        return res.size( ) > 0 ? CmmTrue : CmmFalse;
    }
    CmmBool SettingsTable::Clear( ) {
        if (_db == NULL) {
            return CmmFalse;
        }
        auto ret = _db->Execute("DELETE FROM Settings;");
        return ret;
    }
}
```

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: accessing database configuration information for a database; determining, based on the database configuration information, one or more database instructions to be executed by the database; generating, for each of the one or more database instructions, a program code portion for executing the database instruction; generating database client program code including the one or more program code portions; and outputting the database client program code to a client device to cause the client device to execute at least a portion of the database client program code during a video conference hosted by a video conference provider.

Example 2 is the method of example(s) 1, wherein the database is a relational database, and the one or more database instructions are written in a SQL-based language.

Example 3 is the method of example(s) 2, wherein the one or more database instructions include one or more database configuration SQL statements.

Example 4 is the method of example(s) 2, wherein the one or more database instructions include one or more SQL statements for creating, altering, or deleting a table.

Example 5 is the method of example(s) 2, wherein the one or more database instructions include one or more predetermined SQL queries, wherein at least one predetermined SQL query includes parameterized arguments.

Example 6 is the method of example(s) 2, wherein at least a portion of the database is hosted on the client device.

Example 7 is the method of example(s) 2, wherein the database is SQLite.

Example 8 is the method of example(s) 2, wherein the one or more program code portions and the database client program code are written in a first programming language that is different from the SQL-based language.

Example 9 is the method of example(s) 8, wherein the first programming language is one of C, Java, C++, C#, or Objective C.

Example 10 is the method of example(s) 8, wherein generating the database client program code including the one or more program code portions comprises: accessing one or more templates based on the first programming language, wherein each of the one or more templates includes at least one location for a code portions; generating a database client code file for each template of the one or more templates by mapping at least one of the one or more program code portions to a location in the template; and outputting the database client program code, the database client program code including the one or more generated database client code files.

Example 11 is the method of example(s) 10, wherein the one or more templates are Jinja templates.

Example 12 is the method of example(s) 1, wherein the database configuration information is included in one or more JavaScript Object Notation ("JSON") files.

Example 13 is the method of example(s) 12, wherein the one or more JSON files are generated using a graphical user interface ("GUI").

Example 14 is the method of example(s) 1, wherein the database client program code includes one or more unit tests.

Example 15 is a non-transitory computer-readable medium storing processor-executable instructions configured to cause one or more processors to: access database configuration information for a database; determine, based on the database configuration information, one or more database instructions to be executed by the database; generate, for each of the one or more database instructions, a program code portion for execute the database instruction; generate database client program code including the one or more program code portions; and output the database client program code to a client device to cause the client device to execute at least a portion of the database client program code dur a video conference hosted by a video conference provider.

Example 16 is the non-transitory computer-readable medium of example(s) 15, wherein: the database is SQLite, and the one or more database instructions are written in a SQL-based language; and the one or more database instructions include one or more database configuration SQL statements, one or more SQL statements for creating, altering, or deleting a table, or one or more predetermined SQL queries, wherein at least one predetermined SQL query includes parameterized arguments.

Example 17 is the non-transitory computer-readable medium of example(s) 15, wherein: the one or more database instructions are written in a SQL-based language; the one or more program code portions and the database client program code are written in a first programming language that is one of C, Java, C++, C#, or Objective C; and generating the database client program code including the one or more program code portions comprises: accessing one or more templates based on the first programming language, wherein each of the one or more templates includes at least one location for a code portions; generating a database client code file for each of the one or more templates by mapping at least one of the one or more program code portions to a location in the template; and outputting the database client program code, the database client program code including the one or more generated database client code files.

Example 18 is a system comprising: one or more non-transitory computer-readable media; and one or more processors communicatively coupled to the one or more non-transitory computer-readable media, the one or more processors configured to execute processor-executable instructions stored in the non-transitory computer-readable media to: access database configuration information for a database; determine, based on the database configuration information, one or more database instructions to be executed by the database; generate, for each of the one or more database instructions, a program code portion for executing the database instruction; generate database client program code including the one or more program code portions; and output the database client program code to a client device to cause the client device to execute at least a portion of the database client program code during a video conference hosted by a video conference provider.

Example 19 is the system of example(s) 18, wherein: the database is based on SQLite, and the one or more database instructions are written in a SQL-based language; and the one or more database instructions include one or more database configuration SQL statements, one or more SQL statements for creating, altering, or deleting a table, or one or more predetermined SQL queries, wherein at least one predetermined SQL query includes parameterized arguments.

Example 20 is the system of example(s) 18, wherein: the one or more database instructions are written in a SQL-based language; the one or more program code portions and the database client program code are written in a first programming language that is one of C, Java, C++, C#, or Objective C; and generating the database client program code including the one or more program code portions comprises: accessing one or more Jinja templates based on the first programming language, wherein each of the one or more templates includes at least one location for a code portions; generating a database client code file for each of the one or more templates by mapping at least one of the one or more program code portions to a location in the template; and outputting the database client program code, the database client program code including the one or more generated database client code files.

That which is claimed is:

1. A method, comprising:

accessing database configuration information for a database;

determining, based on the database configuration information, one or more database instructions to be executed by the database;

generating, for each of the one or more database instructions, a program code portion for executing the database instruction;

generating database client program code including the one or more program code portions; and outputting the database client program code to a client device to cause the client device to execute at least a portion of the database client program code during a video conference hosted by a video conference provider.

2. The method of claim 1, wherein the database is a relational database, and the one or more database instructions are written in a SQL-based language.

3. The method of claim 2, wherein the one or more database instructions include one or more database configuration SQL statements.

4. The method of claim 2, wherein the one or more database instructions include one or more SQL statements for creating, altering, or deleting a table.

5. The method of claim 2, wherein the one or more database instructions include one or more predetermined SQL queries, wherein at least one predetermined SQL query includes parameterized arguments.

6. The method of claim 2, wherein at least a portion of the database is hosted on the client device.

7. The method of claim 2, wherein the database is SQLite.

8. The method of claim 2, wherein the one or more program code portions and the database client program code are written in a first programming language that is different from the SQL-based language.

9. The method of claim 8, wherein the first programming language is one of C, Java, C++, C#, or Objective C.

10. The method of claim 8, wherein generating the database client program code including the one or more program code portions comprises:

accessing one or more templates based on the first programming language, wherein each of the one or more templates includes at least one location for a code portions;

generating a database client code file for each template of the one or more templates by mapping at least one of the one or more program code portions to a location in the template; and outputting the database client program code, the database client program code including the one or more generated database client code files.

11. The method of claim 10, wherein the one or more templates are Jinja templates.

12. The method of claim 1, wherein the database configuration information is included in one or more JavaScript Object Notation ("JSON") files.

13. The method of claim 12, wherein the one or more JSON files are generated using a graphical user interface ("GUI").

14. The method of claim 1, wherein the database client program code includes one or more unit tests.

15. A non-transitory computer-readable medium storing processor-executable instructions configured to cause one or more processors to:

access database configuration information for a database;

determine, based on the database configuration information, one or more database instructions to be executed by the database;

generate, for each of the one or more database instructions, a program code portion for execute the database instruction;

generate database client program code including the one or more program code portions; and output the database client program code to a client device to cause the client device to execute at least a portion of the database client program code dur a video conference hosted by a video conference provider.

16. The non-transitory computer-readable medium of claim 15, wherein:

the database is SQLite, and the one or more database instructions are written in a SQL-based language; and the one or more database instructions include one or more database configuration SQL statements, one or more SQL statements for creating, altering, or deleting a table, or one or more predetermined SQL queries, wherein at least one predetermined SQL query includes parameterized arguments.

17. The non-transitory computer-readable medium of claim 15, wherein:

the one or more database instructions are written in a SQL-based language;

the one or more program code portions and the database client program code are written in a first programming language that is one of C, Java, C++, C#, or Objective C; and generating the database client program code including the one or more program code portions comprises:

accessing one or more templates based on the first programming language, wherein each of the one or more templates includes at least one location for a code portions;

generating a database client code file for each of the one or more templates by mapping at least one of the one or more program code portions to a location in the template; and outputting the database client program code, the database client program code including the one or more generated database client code files.

18. A system comprising:

one or more non-transitory computer-readable media; and one or more processors communicatively coupled to the one or more non-transitory computer-readable media, the one or more processors configured to execute processor-executable instructions stored in the non-transitory computer-readable media to:

access database configuration information for a database;

determine, based on the database configuration information, one or more database instructions to be executed by the database;

generate, for each of the one or more database instructions, a program code portion for executing the database instruction;

generate database client program code including the one or more program code portions; and output the database client program code to a client device to cause the client device to execute at least a portion of the database client program code during a video conference hosted by a video conference provider.

19. The system of claim 18, wherein:

the database is based on SQLite, and the one or more database instructions are written in a SQL-based language; and the one or more database instructions include one or more database configuration SQL statements, one or more SQL statements for creating, altering, or deleting a table, or one or more predetermined SQL queries, wherein at least one predetermined SQL query includes parameterized arguments.

20. The system of claim 18, wherein:

the one or more database instructions are written in a SQL-based language;

the one or more program code portions and the database client program code are written in a first programming language that is one of C, Java, C++, C#, or Objective C; and generating the database client program code including the one or more program code portions comprises:

accessing one or more Jinja templates based on the first programming language, wherein each of the one or more templates includes at least one location for a code portions;

generating a database client code file for each of the one or more templates by mapping at least one of the one or more program code portions to a location in the template; and outputting the database client program code, the database client program code including the one or more generated database client code files.

\* \* \* \* \*